JOHN JOHNSON, OF BROOKLYN, NEW YORK.

Letters Patent No. 88,639, dated April 6, 1869.

IMPROVED RUBBER COMPOUND.

The Schedule referred to in these Letters Patent and making part of the same.

*To all whom it may concern:*

Be it known that I, JOHN JOHNSON, of the city of Brooklyn, in the county of Kings, and State of New York, have invented a new and improved Rubber Compound; and I do hereby declare that the following is a full, clear, and exact description of the same.

My invention consists in a compound composed of India rubber and soapstone, with sufficient sulphur to vulcanize the same.

In preparing the improved compound, I take, say, equal parts of crude India rubber and pulverized soapstone, and mix them together in any suitable manner, for instance, by running the same through heated rollers from a hopper, or otherwise. After these ingredients have been properly mixed, I add to the composition, say, about a half ounce of sulphur to the pound of composition.

I then fill a mould or moulds, which may be of any suitable shape or size or material, preferably of metal. Such moulds, so filled, are then sealed, so as to be steam and air-tight, and then put into a steam-cylinder, or vessel, into which cylinder I admit steam under pressure, say, of about ninety pounds, which gives sufficient heat to effect the vulcanization of the compound in the moulds.

The composition in the moulds is then allowed to cool, when it can be dropped out of the moulds, ready for use.

I wish it understood, that I do not limit my invention to the exact proportions hereinabove specified. Less rubber and more soapstone, with the same quantity of sulphur, gives me a harder substance. More rubber and less soapstone, with the same quantity of sulphur, gives me a softer substance; and less soapstone, with more rubber and more sulphur, a harder substance. Nor do I confine myself to the pressure of steam used, as the same may be raised and the requisite degree of heat obtained, and, indeed, superheated or dry steam may be employed.

The compound is useful for many purposes, for making various articles which are now made of hard rubber; but I find it particularly applicable as a packing for steam or other valves or pistons, such packing being durable and reliable.

What I claim as my invention, and desire to secure by Letters Patent, is—

A compound, composed of the ingredients, and prepared in substantially the manner herein specified.

JOHN JOHNSON.

Witnesses:
    M. M. LIVINGSTON,
    T. B. BEECHER.